Aug. 10, 1926.

V. D. LESPINASSE 1,595,307

POULTRY KILLING DEVICE

Filed April 6, 1925

Inventor:
VICTOR D. LESPINASSE

Patented Aug. 10, 1926.

1,595,307

UNITED STATES PATENT OFFICE.

VICTOR D. LESPINASSE, OF CHICAGO, ILLINOIS.

POULTRY-KILLING DEVICE.

Application filed April 6, 1925. Serial No. 20,974.

My invention relates to poultry dispatching devices.

In the large scale killing of chickens and other poultry, the task of picking the feathers is one of the most tedious and time-consuming operations. It has been discovered that if the fowl is dispatched in a certain manner, there is a relaxation of the skin, muscles and nerve centers which enables the main feathers and pin feathers to be removed much more easily than has been possible with previous methods of killing. This new method of dispatching consists primarily in crushing the brain of the fowl. Secondarily, it also consists in cutting the blood vessels emanating from the base of the brain. The fact that this method of dispatching poultry enables the feathers to be plucked more easily is probably explained by the fact that this method may alleviate or avoid rigor mortis.

The object of my invention is to provide an extremely simple and inexpensive device for performing this dispatching operation. The device is so simple in construction and manipulation that its use does not require any particular dexterity or skill on the part of the operator.

Figure 1:
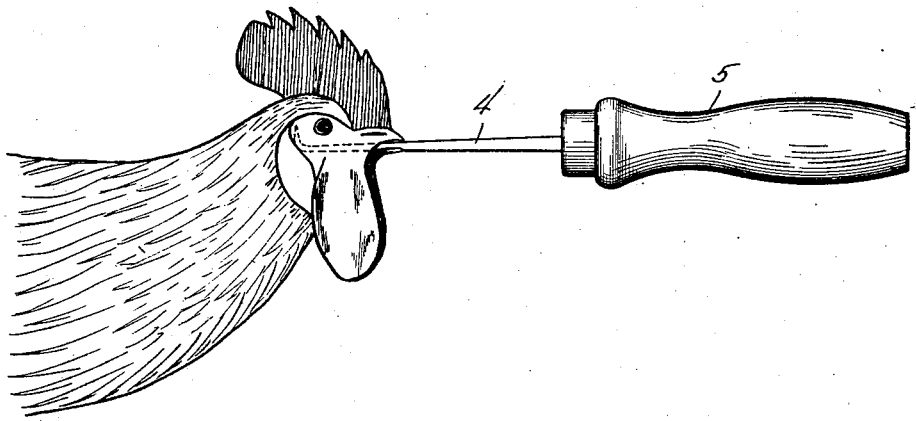
Figure 2:
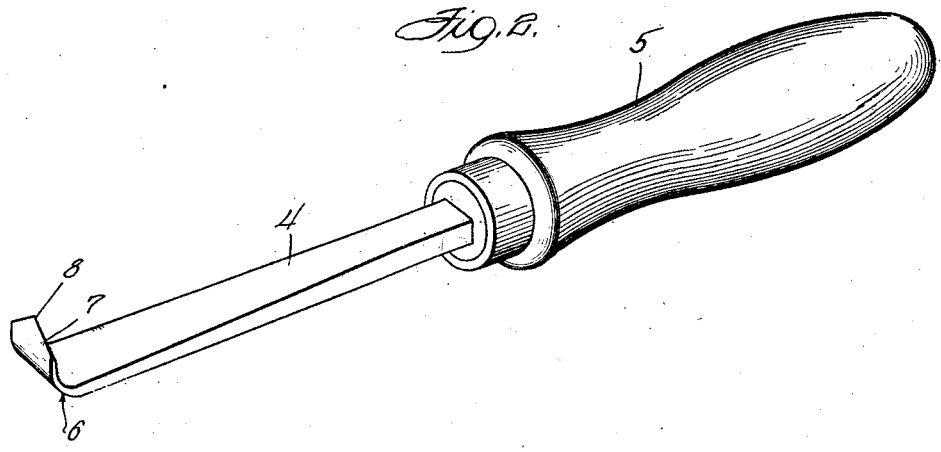

In the accompanying drawing illustrating my invention and its use:

Figure 1 is a view of the head of a fowl showing the dispatching device in the mouth of the fowl; and Figure 2 is a perspective view of the instrument.

The present dispatching device comprises a substantially straight shank 4 of round or any desired section. Preferably, the shank is relatively wide and thin, so that it can be inserted in the mouth of the fowl without difficulty. At one end is secured any suitable form of handle 5. The portion of shank which is anchored in this handle is relatively thick for giving the required rigidity to the instrument, but from the handle the shank preferably tapers in thickness and increases in width towards the operative end. This operative end is curved upwardly through a gradual rounded curve 6. Attention is directed to the fact that this curve 6 forms a sloped or rounded sliding surface by which entry into the mouth of the fowl is easily performed, this rounded end sliding readily over the tongue and base of the mouth. The upturned end is sharpened across its entire width, as indicated at 7, for penetrating the roof of the mouth. This sharpened edge is also preferably provided with a raised central point 8 which assists in this penetrating operation. From this point the sides of this cutting edge slope down at relatively obtuse angles, the point and these sloping side edges being sharpened across the entire cutting edge of the instrument, as before stated.

The device is inserted in the mouth of the fowl, as illustrated in Figure 1, this being readily performed by inclining the instrument slightly to present the upturned end and then sliding the instrument back into the mouth, the curved lower end thus sliding easily over the tongue and the base of the mouth of the fowl. When the device has been thrust back sufficiently far to bring the upturned end in proper position below the brain of the fowl, substantially as illustrated in Figure 1, the operative ends is rocked upwardly while the head of the fowl is firmly held so that this sharpened edge will penetrate the roof of the mouth and crush the brain. In crushing the brain the instrument also severs blood vessels in proximity thereto and thus insures that the fowl will bleed properly.

It will thus be seen that the present device can be operated without any great dexterity or skill. This method of dispatching poultry apparently has some physiological reaction, such as avoiding or dealing rigor mortis, which enables the feathers to be plucked more easily.

I claim:

1. In a poultry dispatching device, a shank, a handle portion at one end of said shank, and an operative portion turned upwardly at substantially a right angle at the other end of said shank adapted to penetrate and crush the brain of the fowl.

2. In a poultry dispatching device, a shank portion, a handle portion at one end of said shank portion, and an operative end upwardly turned at substantially a right angle having a sharpened edge for penetrating or crushing the brain of the fowl.

3. In a poultry dispatching device, a shank having a handle portion at one end and a sharpened operating edge turned substantially perpendicular to the shank at the other end adapted to penetrate or crush the brain of the fowl.

4. In a poultry dispatching device, the combination of a shank, a handle at one end of said shank, an upwardly turned portion at the other end of said shank substantially perpendicular to said shank, said upwardly turned portion being joined to said shank by an outer curve to facilitate insertion of the device, the operating edge of said upwardly turned portion having a substantially central point and sides sloping therefrom, said point and said side edges being sharpened for penetrating and crushing the brain of the fowl.

In witness whereof, I hereunto subscribe my name this 3 day of April, 1925.

VICTOR D. LESPINASSE.